United States Patent
Cho

(10) Patent No.: US 11,453,278 B2
(45) Date of Patent: Sep. 27, 2022

(54) METHOD FOR MANUFACTURING DOOR OUTSIDE BELT OF VEHICLE

(71) Applicants: Hyundai Motor Company, Seoul (KR); Kia Motors Corporation, Seoul (KR)

(72) Inventor: Sung Yong Cho, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 425 days.

(21) Appl. No.: 16/547,975

(22) Filed: Aug. 22, 2019

(65) Prior Publication Data

US 2020/0338970 A1    Oct. 29, 2020

(30) Foreign Application Priority Data

Apr. 24, 2019    (KR) .................. 10-2019-0047663

(51) Int. Cl.
| | |
|---|---|
| *B60J 10/18* | (2016.01) |
| *B60J 10/00* | (2016.01) |
| *B60J 10/246* | (2016.01) |
| *B60J 10/80* | (2016.01) |

(52) U.S. Cl.
CPC ............. *B60J 10/18* (2016.02); *B60J 10/246* (2016.02); *B60J 10/45* (2016.02); *B60J 10/80* (2016.02)

(58) Field of Classification Search
CPC . B60J 10/18; B60J 10/246; B60J 10/45; B60J 10/80
USPC ...................................... 296/146.9
See application file for complete search history.

(56) References Cited

U.S. PATENT DOCUMENTS

2020/0338969 A1 * 10/2020 Cho ................. B29C 48/92

* cited by examiner

*Primary Examiner* — Hilary L Gutman
(74) *Attorney, Agent, or Firm* — Fox Rothschild LLP

(57) ABSTRACT

A method for manufacturing a hybrid-type door outside belt of a vehicle utilizes different materials for a skin layer of a skin body that is mounted to an upper end of a door panel and a main wing that is moved by contacting the door glass, the skin layer of the skin body being made of a material having excellent scratch-resistance, and the main wing being made of a material having an excellent compression set (permanent deformation).

8 Claims, 4 Drawing Sheets

[ SECTION TAKEN ALONG A-A LINE ]

[ SECTION TAKEN ALONG A-A LINE ]

[ SECTION TAKEN ALONG A-A LINE ]

[ CONVENTIONAL ]   [ PRESENT INVENTION ]

METHOD FOR MANUFACTURING DOOR OUTSIDE BELT OF VEHICLE

CROSS REFERENCE TO RELATED APPLICATION

The present application claims under 35 U.S.C. § 119(a) the benefit of Korean Patent Application No. 10-2019-0047663, filed Apr. 24, 2019, the entire contents of which are incorporated by reference herein.

BACKGROUND

(a) Technical Field

The present disclosure relates generally to a method for manufacturing a door outside belt, more particularly, to a method for manufacturing a hybrid-type door outside belt, in which different materials are respectively used in a skin body that is mounted to an upper end of a door panel and a wing part that is moved by contacting a door glass, so as to improve scratch-resistance and appearance of a vehicle door.

(b) Description of the Related Art

As shown in FIG. 1 (RELATED ART), a door panel 10 for a vehicle has been provided with a door outside belt 100 at an upper end thereof. The door outside belt 100 performs a sealing function to prevent dust and foreign material from penetrating into the vehicle by contacting a surface of a door glass 20 and functions as a garnish for improving an appearance of a vehicle door.

FIG. 2 (RELATED ART) is a sectional view showing a structure of a conventional door outside belt and a mounting state thereof.

As shown in FIG. 2, the door outside belt 100 is mounted to the upper end of the door panel 10. The door outside belt 100 includes a skin body 110 fixed to the door panel 10 and a main wing 120 integrally formed on an inside of the skin body 110.

The skin body 110 includes a metal core plate 112 forming a frame of the door panel 10, a first skin layer 114 provided by being extruded over surfaces of the core plate 112, and a second skin layer 116 provided by being extruded on an outer surface of the first skin layer 114 and exposed to the outside of the door panel 10.

The first skin layer 114 is made of a soft thermoplastic vulcanizate (TPV) material. The second skin layer 116 is a portion that is exposed to the outside of the door panel 10, and thus the second skin layer 116 is made of a hard TPV material that has scratch-resistance as compared to the soft TPV material for preventing scratches.

When extrusion molding of the first skin layer 114 is performed, the main wing 120 is molded on a rear surface of the first skin layer 114 in a vertically movable state. In addition, an auxiliary wing 122 is molded with the main wing 120 on an upper end of the rear surface of the first skin layer 114.

The main wing 120 and the auxiliary wing 122 are made of the same soft TPV material as the first skin layer 114.

A method for manufacturing the above-described conventional door outside belt is as follows.

FIG. 3 (RELATED ART) is a schematic flow diagram showing a method for manufacturing the conventional door outside belt.

First, a core plate is uncoiled from a roll around which a flat-plate core plate is wound and is fed into a roll-forming machine.

Next, a roll-forming process for the core plate proceeds in the roll-forming machine.

In this process, the core plate 112 is formed to be divided into a connection end 112-1, an outer molding end 112-2, and an outer supporting end 112-3, as shown in FIG. 2. The connection end 112-1 is inserted into an inside of the door panel 10 and has a vertically standing shape, the outer molding end 112-2 is bent outward from an upper end portion of the connection end 112-1 and exposed to the outside, and the outer supporting end 112-3 is bent inward from a lower end portion of the outer molding end 112-2 and is in close contact with an upper end of an outside surface of the door panel while forming a boundary.

Next, a non-polar TPV adhesive 118 is applied to a surface of the core plate 112, and the adhesive 118 is subjected to high frequency treatment for welding the adhesive 118 on the core plate 112.

Then, an extrusion process proceeds by integrally extruding the first skin layer 114, the second skin layer 116, the main wing 120, and the auxiliary wing 122 over the surface of the core plate 112, and thus the conventional door outside belt is fabricated.

In the conventional door outside belt 100 fabricated by the extrusion process, the core plate 112, the soft TPV first skin layer 114 integrally formed over the surface of the core plate 112, and the hard TPV second skin layer 116 formed on the outer surface of the first skin layer 114 form the skin body 110. In addition, the soft TPV main wing 120 is formed on the rear surface of the first skin layer 114, and simultaneously, the soft TPV auxiliary wing 122 is formed on the upper end of the rear surface of the first skin layer 114.

Accordingly, when the skin body 110 is mounted to the upper end of the door panel 10, the main wing 120 is in close contact with the surface of the door glass 20 so as to be vertically movable, as shown in FIG. 2.

In particular, when the skin body 110 is mounted to the upper end of the door panel 10, the connection end 112-1 of the core plate 112 is inserted into the inside of the door panel 10, the outer molding end 112-2 and the outer supporting end 112-3 are positioned at the outside of the door panel 10, and thus outer surfaces of the second skin layer 116 and the auxiliary wing 122 are exposed to the outside of the door panel and the main wing 120 is in close contact with a surface of the door glass 20 so as to be vertically movable.

As shown in FIG. 2, the main wing 120 is in close contact with the surface of the door glass 20 so as to be vertically movable and perform the sealing function for preventing dust and foreign material from penetrating the inside of the door panel. The outer surfaces of the second skin layer 116 and the auxiliary wing 122 are exposed to the outside of the door panel and function as a molding line or a garnish.

In addition, when the main wing 120 is tilted upward by being in close contact with the door glass 20, the main wing 120 is in close contact with an inside portion of the auxiliary wing 122, and thus the auxiliary wing 122 performs the sealing function with the main wing 120 for preventing dust and foreign material from penetrating the inside of the door panel.

However, the conventional door outside belt has at least the following problems.

First, although the second skin layer 116 is made of the hard TPV material that has scratch-resistance as compared to the soft TPV material, there is a problem that scratches may occur on the surface of the second skin layer 116 due to external forces, as shown in a left drawing of FIG. 6.

Second, as the second skin layer 116 and the auxiliary wing 122 are made of the hard TPV material and the soft TPV material, respectively, the second skin layer 116 and the auxiliary wing 122 are different colors and thus the appearance of the vehicle door is degraded.

That is, the outer surfaces of the second skin layer 116 and the auxiliary wing 122 are exposed to the outside of the door panel and function as the molding line and the garnish to improve the appearance of the vehicle door. However, the hard TPV material for the second skin layer 116 and the soft TPV material for the auxiliary wing 122 have different luster levels due to their consistencies. Therefore, as the second skin layer 116 and the auxiliary wing 122 form a boundary line together and are different colors, the appearance of the vehicle door is degraded, as shown in a left drawing of FIG. 7.

SUMMARY

The present disclosure discloses a method for manufacturing a hybrid-type door outside belt for a vehicle. The door outside belt is configured such that different materials are respectively used in a skin layer of a skin body that is mounted to an upper end of a door panel and a main wing that is moved by contacting a door glass, where the skin layer of the skin body is made of a polyvinyl chloride (PVC) material having an excellent scratch-resistance, and the main wing is made of a TPV material having an excellent compression set ("compression set" refers to a permanent deformation of a material). Accordingly, the hybrid-type door outside belt can be improved in scratch-resistance and appearance.

In order to achieve the above object, according to one aspect of the present disclosure, there is provided a method for manufacturing a door outside belt of a vehicle, the method including: preparing a core plate in a flat-plate shape, the core plate providing a frame of the door outside belt; applying a PVC adhesive to a first surface of the core plate, and simultaneously, applying a PVC adhesive and a TPV adhesive to a second surface of the core plate with a gap between the PVC and TPV adhesives; forming the core plate into a shape with a predetermined section by feeding the core plate to which the PVC adhesive and the TPV adhesive are applied into a roll-forming machine and by bending the core plate; and extruding, after the forming, a PVC skin layer and a PVC auxiliary wing on an area of the core plate to which the PVC adhesive is applied, and simultaneously, extruding a TPV main wing on an area thereof to which the TPV adhesive is applied.

In applying the adhesives, the PVC adhesive and the TPV adhesive applied to the second surface of the core plate may be applied with approximately a 1-3 mm buffer section between the adhesives so as to prevent the adhesives from being mixed together.

Preferably, the PVC adhesive may be a polar acrylic adhesive, and the TPV adhesive may be a non-polar olefin adhesive.

The core plate may be formed to be divided into a connection end that is inserted into an inside of a door panel and has a vertically standing shape, an outer molding end that is bent outward from an upper end portion of the connection end, and an outer supporting end that is bent inward from a lower end portion of the outer molding end, wherein a bent portion between the connection end and the outer molding end and a bent portion between the outer molding end and the outer supporting end may be formed with a radius of curvature (R) ranging from approximately 1-30 mm.

Especially, after forming the core plate, the PVC adhesive may be applied to entire outside and inside surfaces of both the outer molding end and the outer supporting end, and simultaneously, the PVC adhesive may be applied to surfaces of upper and lower ends of an outer surface of the connection end and to an entire inner surface of the connection end, and the PVC skin layer and the PVC auxiliary wing may be provided by being extruded on the applied PVC adhesive.

In addition, after forming the core plate, the TPV adhesive may be applied to a surface between the upper and lower ends of the outer surface of the connection end, and the TPV main wing made of a soft TPV material may be provided by being extruded on the applied TPV adhesive.

In the extruding step, an optimal extrusion molding temperature of PVC that is used as a material of the skin layer and the auxiliary wing may be a temperature ranging from approximately 110° C.-175° C., and an optimal extrusion molding temperature of TPV that is used as a material of the main wing may be a temperature ranging from approximately 165° C.-210° C., and in view of the optimal temperatures, the skin layer and the auxiliary wing in addition to the main wing may be provided by being extruded at a temperature ranging from approximately 165° C.-170° C., simultaneously.

Preferably, when the TPV main wing is provided by being extruded, an end of the TPV main wing may be provided to have greater hardness (Hs) than another part thereof, in order to prevent contact noise between the TPV main wing and the PVC auxiliary wing formed of a different material from the TPV main wing.

By the technical solution means as described above, the present disclosure can achieve the following effects.

First, since the skin layer and the auxiliary wing of the door outside belt are made of an extruded PVC material that has excellent scratch-resistance as compared to a hard TPV material, even when an external force is applied to the skin layer and the auxiliary wing exposed to the outside of the door panel, scratches on the door outside belt can be prevented.

Second, since the skin layer and the auxiliary wing which are exposed to the outside of the door panel are the same extruded PVC material, unlike a conventional case in which a second skin layer and an auxiliary wing show different colors from each other due to being different materials, the skin layer and the auxiliary wing of the present disclosure show the same color and thus the appearance of the vehicle door can be improved.

Third, since the PVC material that is relatively inexpensive compared to the TPV material is applied to the skin layer and the auxiliary wing of the door outside belt, manufacturing costs of the door outside belt can be reduced.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, an exemplary embodiment of the present disclosure will be described in detail with reference to the accompanying drawings.

Figure 1:
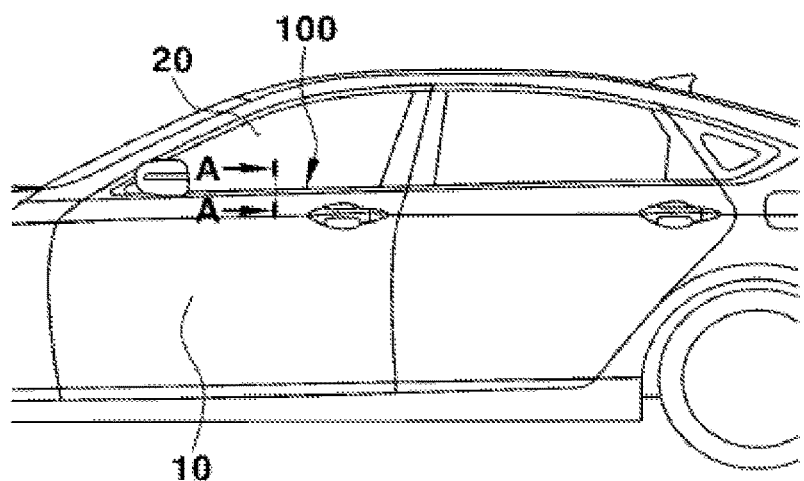
FIG. 1 (RELATED ART) is a schematic view showing a location of a door outside belt apparatus of a vehicle.
Figure 2:
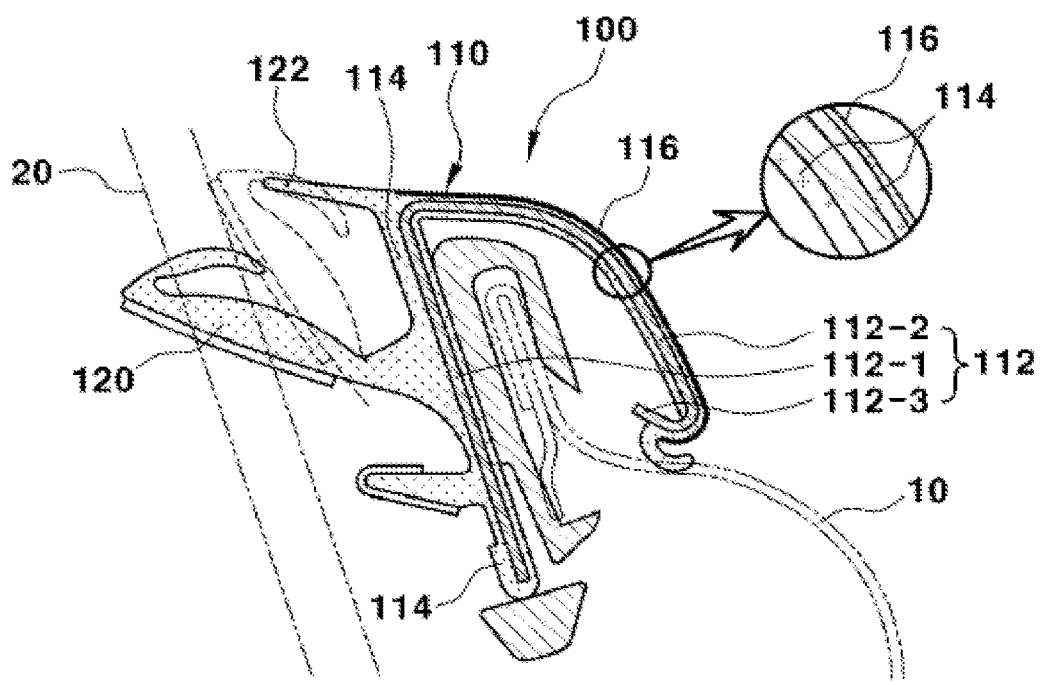
FIG. 2 (RELATED ART) is a sectional view showing a structure of a conventional door outside belt taken along A-A line of FIG. 1.
Figure 3:
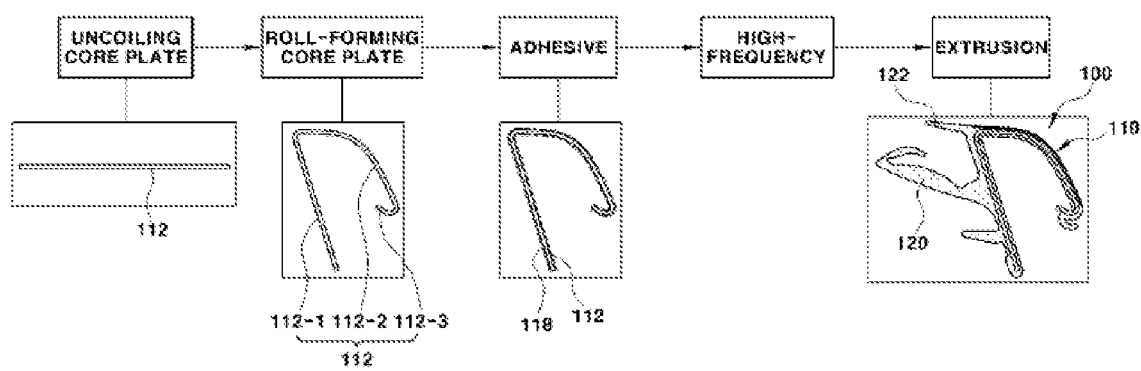
FIG. 3 (RELATED ART) is a schematic flow diagram showing a method for manufacturing the conventional door outside belt.
Figure 4:
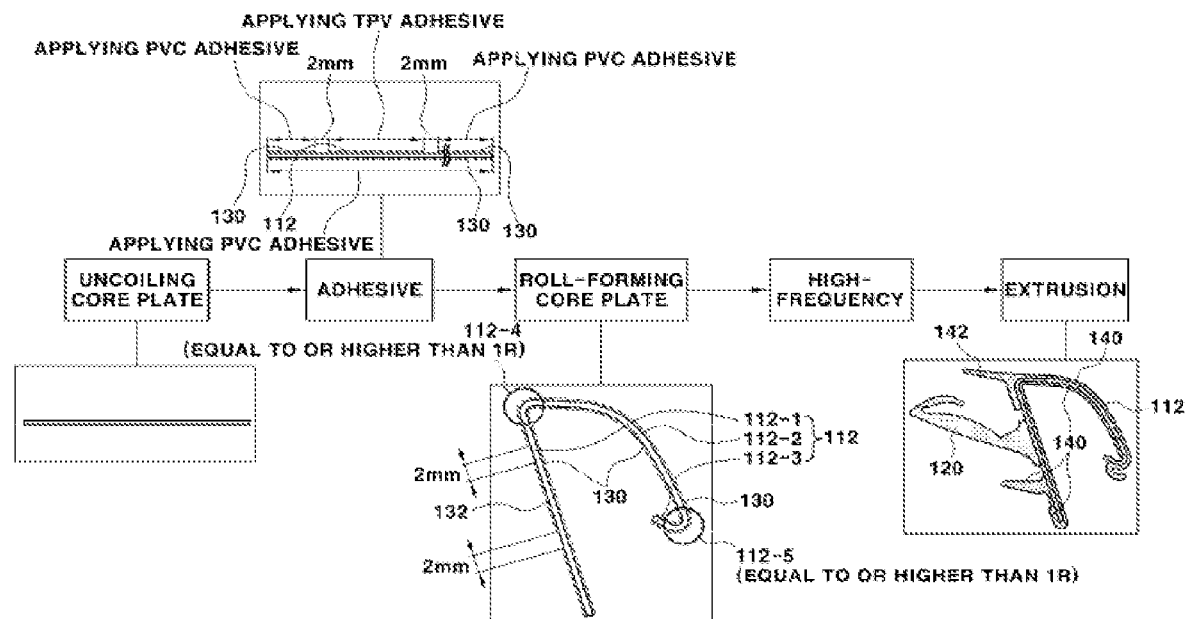
FIG. 4 is a schematic flow diagram showing a method for manufacturing a door outside belt according to the present disclosure.
Figure 5:
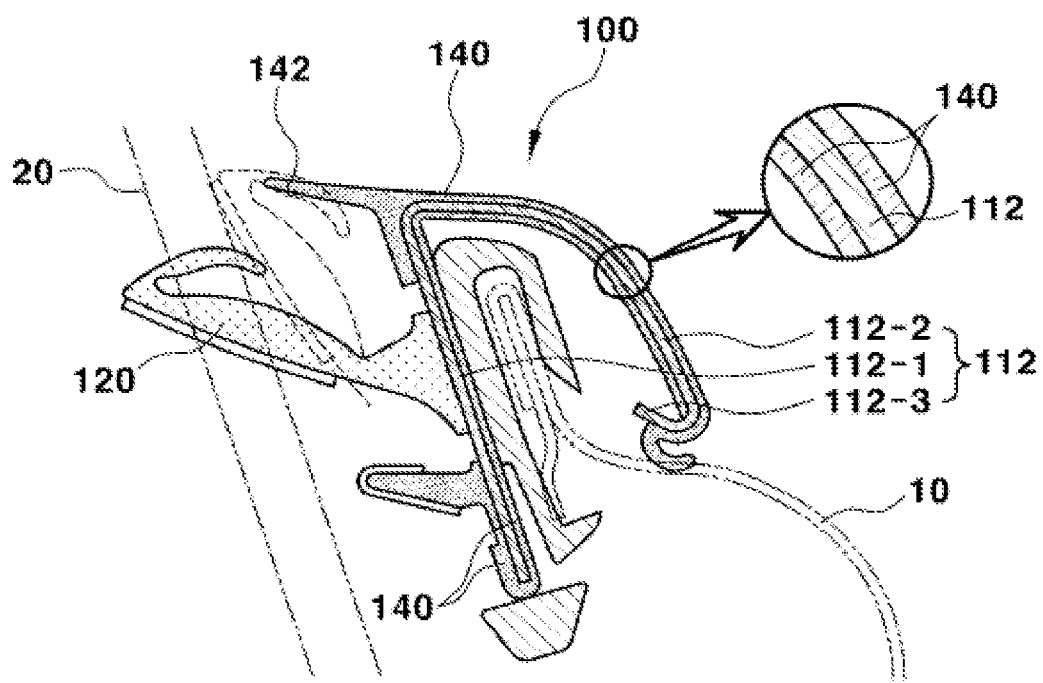
FIG. 5 is a sectional view showing a structure and a mounting state of the door outside belt according to the present disclosure.

FIG. 4 is a schematic flow diagram showing a method for manufacturing a door outside belt according to the present disclosure. FIG. 5 is a sectional view showing a structure and a mounting state of the door outside belt according to the present disclosure.

After a core plate is uncoiled from a roll around which a core plate 112 made of stainless steel (SUS) or aluminum (AL) is coiled, two types of adhesives are applied to an inner surface and an outer surface of the core plate 112, respectively.

That is, when the core plate 112 is fed into a roll-forming machine and then formed in a predetermined sectional form before the two types of adhesives are applied thereto, there is a problem that an adhesive is not evenly applied to a bent portion of the core plate 112 that is generated during roll-forming. Accordingly, it is preferable that the two types of adhesives are applied to the core plate 112 when the core plate 112 is in a flat state by being uncoiled from the roll.

Therefore, an adhesive applying process proceeds such that a polyvinyl chloride (PVC) adhesive 130 is applied to a first surface of the core plate 112, and simultaneously, the PVC adhesive 130 and a thermoplastic vulcanizate (TPV) adhesive 132 are applied to a second surface thereof with an interval between the adhesives.

A polar acrylic adhesive is used as the PVC adhesive 130 for smooth adhesion between a PVC structure and a stainless steel (SUS) or aluminum (AL) metallic material. A non-polar olefin adhesive is used as the TPV adhesive 132 for smooth adhesion between a TPV structure and the stainless steel (SUS) or aluminum (AL) metallic material. Preferably, the PVC adhesive 130 and the TPV adhesive 132 are disposed so as not to overlap or be mixed together.

For the reasons provided above, the PVC adhesive 130 and the TPV adhesive 132 are applied to the second surface of the core plate 112 with approximately 1-3 mm buffer sections between the adhesives so as to prevent the adhesives from being mixed together, as shown in FIG. 4.

Next, the flat-plate core plate 112 to which the PVC adhesive 130 and the TPV adhesive 132 are applied is fed into the roll-forming machine and formed in a shape which forms a frame of the door outside belt.

In a forming process by the roll-forming machine, the core plate 112 is formed to have a connection end 112-1, and outer molding end 112-2, and an outer supporting end 112-3. The connection end 112-1 has a vertically standing shape, the outer molding end 112-2 is bent outward from an upper end portion of the connection end 112-1, and the outer supporting end 112-3 is bent inward from a lower end portion of the outer molding end 112-2. Especially, a bent portion 112-4 between the connection end 112-1 and the outer molding end 112-2 and a bent portion 112-5 between the outer molding end 112-2 and the outer supporting end 112-3 are formed with a radius of curvature R greater than or equal to 1 mm, preferably, with a radius of curvature R ranging from approximately 1-30 mm.

Reasons for forming the bent portions 112-4 and 112-5 with the radius of curvature R ranging from approximately 1-30 mm are as follows. One reason is to smoothly mount the door outside belt having the core plate 112 as an inner frame to an upper end of the door panel depending on the vehicle type, because vehicles have a variety of shapes of door panels depending on vehicle types. Another reason is to prevent the PVC adhesive 130 from being removed from outer surfaces of the bent portions 112-4 and 112-5, where removing of the PVC adhesive occurs due to stress concentrated on the bent portions 112-4 and 112-5 during the forming process.

That is, when the bent portions 112-4 and 112-5 are bent with a radius of curvature R less than 1 mm, the PVC adhesive 130 applied to the outer surfaces of the bent portions 112-4 and 112-5 is removed from the surfaces easily due to the stress concentrated on the bent portions 112-4 and 112-5. However, when the bent portions 112-4 and 112-5 are formed with the radius of curvature R greater than or equal to 1 mm, it is possible to minimize or prevent the removing of the PVC adhesive 130. Therefore, it is preferable that the bent portions 112-4 and 112-5 are formed with the radius of curvature R greater than or equal to 1 mm, and more preferably, the bent portions 112-4 and 112-5 are formed with the radius of curvature R ranging from approximately 1-30 mm for accommodating various door structures and door shapes for vehicle types.

Next, an extrusion process proceeds. In this process, a PVC skin layer 140 and a PVC auxiliary wing 142 are extruded on a surface, where the PVC adhesive 130 is applied, of the core plate 112 formed as described above. Simultaneously, a TPV main wing 120 is extruded on an area where the TPV adhesive 132 is applied by using a known extruding device.

For example, when the core plate 112 formed as described above passes through the extruding device, PVC resin is extruded from a PVC supply nozzle provided in a location of the extruding device to the surface of the core plate 112 where the PVC adhesive 130 is applied. Simultaneously, TPV resin is extruded from a TPV supply nozzle provided in another location of the extruding device to the area of the core plate 112 where the TPV adhesive 132 is applied. Accordingly, the PVC skin layer 140 and the PVC auxiliary wing 142 can be extruded on the surface of the core plate 112 where the PVC adhesive 130 is applied, and the TPV main wing 120 can be extruded on the area where the TPV adhesive 132 is applied.

Particularly, the PVC adhesive 130 and the TPV adhesive 132 are applied to the core plate 112 before the above-described forming process. For the reasons provided above, even when the core plate 112 is formed to have the connection end 112-1 having the vertically standing shape, the outer molding end 112-2 bent outward from the upper end portion of the connection end 112-1, and the outer supporting end 112-3 bent inward from a lower end portion of the outer molding end 112-2 by the forming process, the PVC adhesive 130 is applied to the entire inner and outer surfaces of the outer molding end 112-3 and the outer supporting end 112-3, and the PVC adhesive 130 is also applied to an entire inner surface of the connection end 120-1 and upper and lower ends of the outer surface thereof.

In addition, the TPV adhesive 132 is applied to a partial section between the upper and lower ends of the outer surface of the connection end 112-1 with 1-3 mm buffer sections between upper and lower PVC adhesives 130.

Therefore, in the extrusion process, the PVC skin layer 140 and the PVC auxiliary wing 142 are integrally extruded over the inner and outer surfaces of the outer molding end 112-2 and the outer supporting end 112-3 to which the PVC adhesive 130 is applied, the entire inner surface of the connection end 112-1, and the upper and lower ends of the outer surface of the connection end 112-1.

In addition, in the extrusion process, the soft TPV main wing 120 is integrally extruded over the part between the upper and lower ends of the outer surface of the connection end 112-1, that is, a surface with the TPV adhesive 132.

Meanwhile, an optimal extrusion molding temperature of PVC resin when the PVC resin forming the PVC skin layer 140 and the PVC auxiliary wing 142 is extruded from the extruding device is a temperature ranging from approximately 110° C.-175° C., and an optimal extrusion molding temperature of TPV resin when the TPV resin forming the main wing is extruded from the extruding device is a temperature ranging from approximately 165° C.-210° C. In view of this, the PVC skin layer 140 and the PVC auxiliary wing 142 in addition to the main wing 120 are extruded at a temperature ranging from approximately 165° C.-170° C. at which the PVC resin and the TPV resin can be extruded simultaneously.

According to a method for manufacturing the door outside belt of the present disclosure as described above, the door outside belt manufactured by the method includes the core plate 112 forming the frame of the door outside belt, the PVC skin layer 140 extruded over the inner surface and the outer surface of the core plate 112, the PVC auxiliary wing 142 integrally molded on the inside upper end of the PVC skin layer 140, and the TPV main wing 120 extruded on the partial section of the inside outer surface of the core plate 112.

In particular, as shown in FIG. 5, the door outside belt of the present disclosure manufactured by the above-described method includes: the metal core plate 112 forming the frame of the door outside belt; the PVC skin layer 140 that is extruded on the entire inner surface of the connection end 112-1 and the upper and lower ends of the outer surface thereof, in addition to the entire inner and outer surfaces of the outer molding end 112-2 and the outer supporting end 112-3 provided in the core plate 112; the PVC auxiliary wing 142 that is integrally molded on the inside upper end of the PVC skin layer 140; and the soft TPV main wing 120 that is extruded on the surface between the upper and lower ends of the outer surface of the connection end 112-1.

The door outside belt of the present disclosure manufactured as described above is mounted on an upper end of the door panel 10, as shown in FIG. 5.

That is, as the upper end of the door panel 10 is fitted into an inside between the connection end 112-1 and the outer molding end 112-2 of the core plate 112, the door outside belt of the present disclosure is fixed on the upper end of the door panel 10.

Simultaneously, the main wing 120 is in close contact with a surface of a door glass 20 so as to be vertically movable.

In particular, the connection end 112-1 of the core plate 112 is inserted into an inside of the door panel 10 and then the outer molding end 112-2 and the outer supporting end 112-3 are located at the outside the door panel 10. Therefore, outer surfaces of the PVC skin layer 140 and the PVC auxiliary wing 142 are exposed to the outside of the door panel 10. In addition, the TPV main wing 120 is in close contact with the surface of the door glass 20 so as to be vertically movable.

As shown in FIG. 5, with up and down movement of the door glass 20, the TPV main wing 120 is folded and then contacts the PVC auxiliary wing 142 formed of a different material from the TPV main wing 120. Thus, a friction connection may be generated therein.

To solve this problem, when the TPV main wing 120 is extruded from the known extruding device, an end of the TPV main wing 120 (that is, a part contacting the PVC auxiliary wing 142) is extruded to have greater hardness (Hs) than another part of the main wing 120. Therefore, when the end of the TPV main wing 120 contacts the PVC auxiliary wing 142 in which the different material is used, the TPV main wing 120 is induced to slidingly contact the PVC auxiliary wing 142 without friction. Accordingly, friction connection can be easily prevented.

The TPV main wing 120 is in close contact with the surface of the door glass 20 so as to be vertically movable and perform a sealing function for preventing dust and foreign material from being penetrated into the door panel. Outer surfaces of the PVC skin layer 140 and the PVC auxiliary wing 142 are exposed to the outside and function as molding lines and garnishes.

In addition, when the main wing 120 is tiled upward by being in close contact with the door glass 20, the main wing 120 is in closed contact with an inside portion of the PVC auxiliary wing 142. Here, the PVC auxiliary wing 142 also performs the sealing function with the main wing 120 for preventing dust and foreign material penetrating into the door panel.

Figure 6:
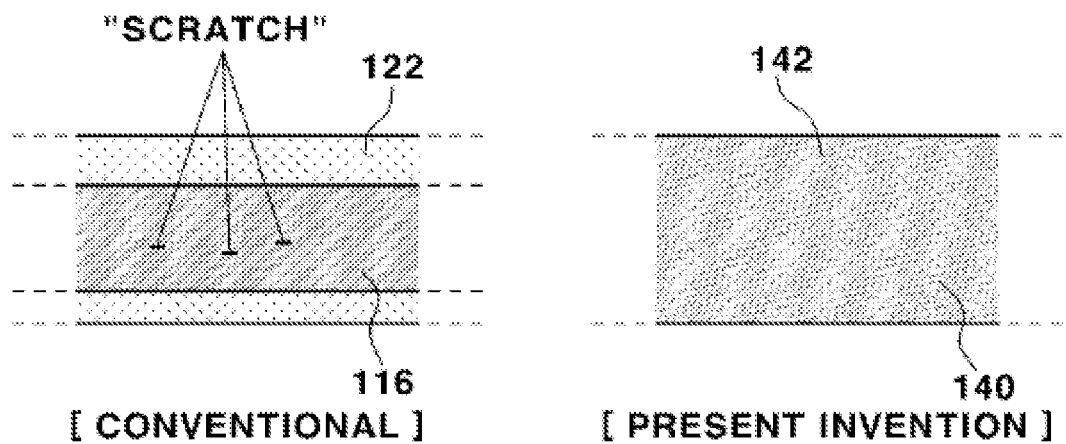
FIG. 6 is a view showing a comparison between scratch test results of the conventional door outside belt and the door outside belt of the present disclosure.

According to the present disclosure, the PVC skin layer 140 and the PVC auxiliary wing 142 of the door outside belt are an extruded PVC material that has excellent scratch-resistance as compared to a hard TPV material. Thus, the outer surfaces of the PVC skin layer 140 and the PVC auxiliary wing 142 exposed to the outside of the door panel can be maintained in a clean state without scratches, as shown in a right drawing of FIG. 6.

Figure 7:
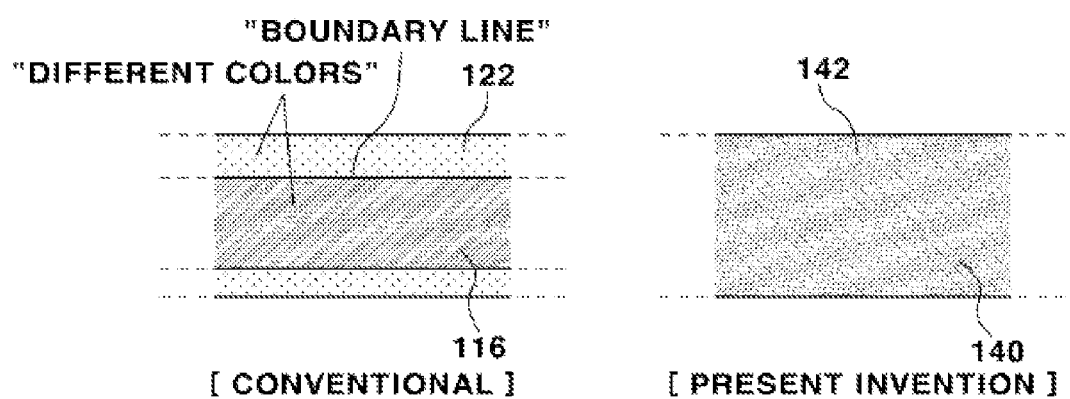
FIG. 7 is a view showing a comparison between colors of the conventional door outside belt and the door outside belt of the present disclosure.

In addition, the PVC skin layer 140 and the PVC auxiliary wing 142 are the same extruded PVC material. Therefore, unlike a conventional case in which a second skin layer and an auxiliary wing make a boundary line and are different colors due to being formed of different materials, the PVC skin layer 140 and the PVC auxiliary wing 142 are the same color, as shown in a right drawing of FIG. 7. Accordingly, the door outside belt of the present disclosure has a satisfactory appearance as compared to the conventional door outside belt.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method for manufacturing a door outside belt of a vehicle, the method comprising:
    preparing a core plate in a flat-plate shape, the core plate providing a frame of the door outside belt;
    applying a polyvinyl chloride (PVC) adhesive to a first surface of the core plate, and simultaneously, applying the PVC adhesive and a thermoplastic vulcanizate (TPV) adhesive to a second surface of the core plate with a gap between the PVC and TPV adhesives;
    forming the core plate into a shape with a predetermined section by feeding the core plate to which the PVC adhesive and the TPV adhesive are applied into a roll-forming machine and by bending the core plate; and
    extruding, after forming the core plate, a PVC skin layer and a PVC auxiliary wing on an area of the core plate to which the PVC adhesive is applied, and simultaneously, extruding a TPV main wing on an area thereof to which the TPV adhesive is applied.

2. The method of claim 1, wherein in applying the adhesives, the PVC adhesive and the TPV adhesive applied to the second surface of the core plate are applied with approximately a 1-3 mm buffer section which is the gap between the adhesives so as to prevent the adhesives from being mixed together.

3. The method of claim 1, wherein the PVC adhesive is a polar acrylic adhesive, and the TPV adhesive is a non-polar olefin adhesive.

4. The method of claim 1, wherein in forming the core plate, the core plate is formed to be divided into a connection end that is inserted into an inside of a door panel and has a vertically standing shape, an outer molding end that is bent outward from an upper end portion of the connection end, and an outer supporting end that is bent inward from a lower end portion of the outer molding end, and
    a bent portion between the connection end and the outer molding end and a second bent portion between the outer molding end and the outer supporting end are formed with a radius of curvature (R) ranging from approximately 1-30 mm.

5. The method of claim 4, wherein before forming the core plate, the PVC adhesive for adhering the PVC skin layer is applied to entire outer and inner surfaces of both the outer molding end and the outer supporting end, and simultaneously, the PVC adhesive for adhering the PVC auxiliary wing is applied to surfaces of upper and lower ends of an outer surface of the connection end and to an entire inner surface of the connection end, and the PVC skin layer and the PVC auxiliary wing are provided by being extruded on the applied PVC adhesive.

6. The method of claim 4, wherein before forming the core plate, the TPV adhesive adhering for the TPV main wing is applied to a surface between an upper end and a lower end of an outer surface of the connection end, and the TPV main wing made of a soft TPV material is provided by being extruded on the applied TPV adhesive.

7. The method of claim 1, wherein in the extruding, an optimal extrusion molding temperature of PVC that is used as a material of the skin layer and the auxiliary wing is a temperature ranging from approximately 110° C. to 175° C., and an optimal extrusion molding temperature of TPV that is used as a material of the main wing is a temperature ranging from approximately 165° C. to 210° C., and in view of the optimal temperatures, the skin layer and the auxiliary wing in addition to the main wing are provided by being extruded at a temperature ranging from approximately 165° C. to 170° C., simultaneously.

8. The method of claim 1, wherein when the TPV main wing is being extruded, an end of the TPV main wing is provided to have greater hardness (Hs) than another part of the TPV main wing, in order to prevent contact noise between the TPV main wing and the PVC auxiliary wing formed of a different material from the TPV main wing.

* * * * *